United States Patent
Blood et al.

(10) Patent No.: US 6,202,067 B1
(45) Date of Patent: Mar. 13, 2001

(54) METHOD AND APPARATUS FOR CORRECT AND COMPLETE TRANSACTIONS IN A FAULT TOLERANT DISTRIBUTED DATABASE SYSTEM

(75) Inventors: Mark Lawrence Blood; Stephen Dexter Coomer, both of Gahanna; David Dayton Nason, Pickerington; Mohamad-Reza Yamini, Powell, all of OH (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/056,499

(22) Filed: Apr. 7, 1998

(51) Int. Cl.[7] .................................................. G06F 17/30
(52) U.S. Cl. .............................. 707/10; 707/202; 707/8; 709/208; 709/209; 712/31; 713/1; 714/13
(58) Field of Search ........................ 371/61, 62; 707/202, 707/10, 8, 204; 713/1; 709/208, 209; 712/31; 714/13

(56) References Cited

U.S. PATENT DOCUMENTS

| | | | |
|---|---|---|---|
| 3,810,119 | * 5/1974 | Zieve et al. ............................. | 713/1 |
| 5,212,789 | * 5/1993 | Rago ....................................... | 707/8 |
| 5,222,217 | * 6/1993 | Blount et al. ......................... | 707/204 |
| 5,261,089 | * 11/1993 | Coleman et al. ........................ | 707/8 |
| 5,280,612 | * 1/1994 | Lorie et al. .............................. | 707/8 |
| 5,333,314 | * 7/1994 | Masai et al. .......................... | 707/202 |
| 5,465,328 | * 11/1995 | Dievendorff et al. ................. | 714/15 |
| 5,630,152 | * 5/1997 | DeLuca et al. ........................ | 712/31 |
| 5,799,305 | * 8/1998 | Bortvedt et al. ...................... | 707/10 |
| 5,884,327 | * 3/1999 | Cotner et al. ........................ | 707/202 |
| 5,920,715 | * 7/1999 | Heckel et al. ........................ | 364/132 |
| 5,951,683 | * 9/1999 | Yuuki et al. ............................. | 713/1 |
| 5,974,503 | * 10/1999 | Venkatesh et al. ................... | 711/114 |
| 5,996,058 | * 11/1999 | Song et al. ............................ | 712/31 |
| 6,035,415 | * 3/2000 | Fleming ................................ | 714/11 |
| 6,035,417 | * 3/2000 | Kanazawa ............................. | 714/13 |

* cited by examiner

Primary Examiner—Hosain T. Alam
Assistant Examiner—Jean M. Corrielus (57) ABSTRACT

In a distributed network of processors, a method for completing update transactions using update transaction timers after failure of one processor. Failed slave processors are updated with other slave processors using a record of the last completed database update transaction at each processor prior to failure and using a journal in the master processor that records steps of database update transactions generated by the master database processor.

32 Claims, 7 Drawing Sheets

METHOD AND APPARATUS FOR CORRECT AND COMPLETE TRANSACTIONS IN A FAULT TOLERANT DISTRIBUTED DATABASE SYSTEM

BACKGROUND OF THE INVENTION

1. Field of the Invention

This invention relates to a method and apparatus for completing transactions in a fault tolerant distributed database system.

2. Description of the Prior Art

A distributed database system refers typically to a system with two or more separate intercommunicating databases. At least part of the stored data is identical in two or more database copies. Therefore, when common data is changed in one of the database copies, the same change must be made in all the other database copies in order to keep the databases uniform throughout the database system. Under normal circumstances, database changes are made by a master database controller. The database master controller makes changes to its own copy of the database and has responsibility for controlling updates to other copies of the database that comprise the network. Problems arise, however, when faults occurring either in the database copies or the links coupling the copies to the database master controller prevent the transmission or change to all or part of the databases.

Within a distributed database network, information is entered to the individual databases by a transaction. A database "transaction" is a sequence of user controlled (or master database controlled) database actions which is marked by both a "begin step" and an "end step." The database actions between a begin step and an end step comprise steps or actions by which a database is updated. The end step can be either a commit or an abort. A commit is an instruction to carry out the previous updating transactions, effectively changing the database. An abort is an instruction to void the previous updating transactions. There are two types of transactions that may occur at each processor: cold transactions and hot transactions. A cold transaction is a transaction that has already been completed and is used only during the recovery period of a failed database processor. A hot transaction is an ongoing transaction that has not completed or aborted.

Distributed databases in the telecommunications industry need to be reliable with a high degree of availability. Additionally, these systems need to be fault tolerant as well: the failure of one database copy should not bring down the entire system. The telecommunications industry is very demanding in this regard, as seen in the example of access to information such as 800 numbers. When a call is placed, the response time between the query to the database and the return of the corresponding number associated with the query needs to be immediate and reliable. Any responsive delay creates a delay in completing the call resulting in customer unsatisfaction.

In a distributed database system, data base synchronization is usually provided with an algorithm called "two-phase commit". A two-phase commit is executed with one copy of the database designated as the "coordinator", a "master" or a controller and all the other copies in the distributed database system designated as the "participants", the "slave" nodes or copies. The two-phase commit algorithm operates as follows:

Phase 1

The coordinator sends a message through the network to all participants requesting them to commit a transaction such as updating one or more database records. If a database participant has failed or is otherwise out of service or unavailable, then it should reply to the coordinator with the message indicating it is not ready to commit the transaction. If a participant is unable to respond due to the failure, the "not ready" response is assumed by the coordinator. The coordinator waits to receive responses from all participants before entering Phase 2.

Phase 2

If all database participants respond positively, then the coordinator broadcasts a "commit" message or command to all database participants so that the participants will commit the transaction. If any participant responds with a message indicating a failure or fails to respond, then the coordinator broadcasts an abort message to all participants.

For the master to know the status of active and available participants for the two-phase commit, the master keeps a dynamic list of active and available database processors known as a "quorum". This dynamic list is used by the master to determine which database processors are active and available, and as such are available to receive update transactions. If a database processor is on the list, it is assumed to be available to successfully commit a transaction.

The object of the present invention is to provide a distributed database system that provides for an appropriate completion to a transaction that did not complete normally because of a failure of the master database processor. It is desirable if the completion of the transaction occurs without the guidance of a new master and without undoing or redoing the transaction.

It is a further object of the present invention to provide a distributed database system that allows all non-failing participants to automatically perform any fault recovery without external coordination eliminating the resulting delay associated with failed transaction cleanup. Further, failing participants are allowed to resynchronize with the non-failed community and participate in new transactions without interrupting any transactions that may be underway during the resynchronization period.

SUMMARY OF THE INVENTION

In accordance with one aspect of the invention, the foregoing is achieved by providing a method and apparatus for completing database transactions in a distributed database system that may have failed because one or more of the database participants may have failed. If the master database processor fails, all of the non-failing participants either commit the transaction or abort the transaction pending the return to service or replacement of the master database processor. If one of the slave processors fails, either while a transaction is under way or no transaction is under way, the failing slave processor can be resynchronized with the community without affecting the other slave processors that did not fail. When a failed processor returns to service, it can be updated to identically match slave processors that were updated during the time the failed processor was out of contact with the master database processor.

In one embodiment, the invention provides for a pair of timers associated with each of the slave processors. The first timer starts when the begin step of an update transaction is received by the slave processor. The second timer starts when the slave processor is in position to commit the transaction. The first timer resets after receiving each step of an update transaction. If the first timer "times-out" or expires before receiving the next step of the update transaction, the slave processor aborts the current transaction. Upon the conclusion of an update transaction, the master database processor issues a request to commit message to the slave processors querying whether the slave processors can commit the database update transaction. The vote to commit response by each slave processor to the request to commit message triggers the second timer associated with each slave processor. Once the request to commit message is sent from the master processor to the slave processor, the first timer is disabled until a new transaction is received. If the second timer "times-out", the slave processor commits the transaction.

If the first timer of a slave processor "times-out" it aborts the current transaction, and sends a global abort message to all slave processors. In response to receiving the global abort message, slave processors receiving the global abort will thereafter also abort the current transaction and will transmit its own global abort message to all the slave processors. The result is that all slave processors will abort the current transaction and the network of processors will come to the identical state.

In the preferred embodiment, a record of each update transaction performed by the master database processor is maintained by the master database processor in a journal or log, which is preferably a circular queue or buffer. Old records in the journal are eventually overwritten with the most recent update transaction. Each slave processor also maintains a record of at least the most recent database update transaction that the slave processor was able to successfully commit.

In a high-reliability database system, when one slave processor fails or communication with it is lost, other copies of the database that remain in service might be updated during the period when the failed database copy is out of service. Eventually the failed slave processor will return to service, but upon so doing, it might not have data that is current with respect to other copies of the database throughout the network. To update the previously lost database copy, the journal or log of transactions that were performed while the slave processor was out of service is used to re-create transactions missed by the failed slave processor. Each slave processor keeps track of, or records, the identity of the most recent transaction that was last completed. From this record of the last completed transaction, the master processor and the failed processor use completed transactions recorded in the journal within the master to resynchronize itself with the other processors.

The transaction and order identifiers and the associated data are entered into the journal. Based on these identifiers, a participant can determine what the next expected task is without the need to know the nature of the task. Once the failure is corrected, the failed participant requests the first numbered transaction it missed from the journal and any transaction subsequent to the first missed transaction. Once the participant has entered all the missed transactions, it rejoins the network and can receive new transactions.

BRIEF DESCRIPTION OF THE DRAWINGS

Features of this invention will be understood best from the following detailed description taken in conjunction with the drawings.

DETAILED DESCRIPTION OF THE PREFERRED EMBODIMENT

Figure 1:
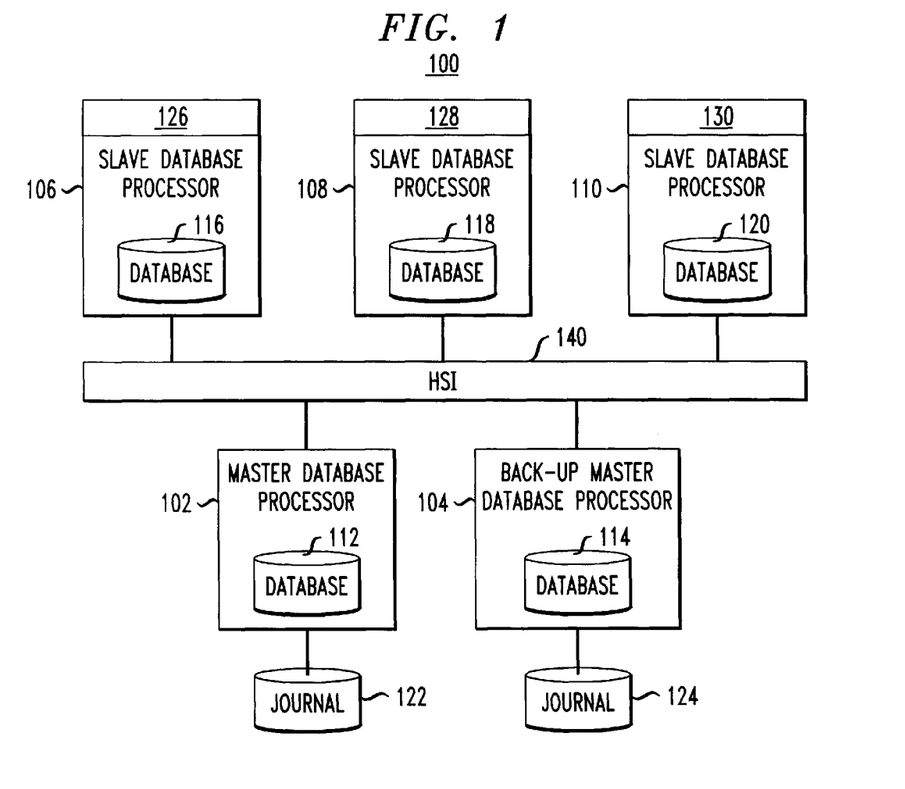
FIG. 1 is a simplified block diagram of a distributed database system.

FIG. 1 shows a distributed network of processors 100 comprised of a master processor 102 and at least one backup master processor 104. FIG. 1 also shows several slave or participant processors 106, 108 and 110. Each of the processors 102, 104, 106, 108 and 110 has associated with it and controls a database 112, 114, 116, 118 and 120 associated with each of these processors as shown. The database record shown 112, 114, 116, 118 and 120 might be comprised of disc records that might also be stored on tape or other magnetic media and may also be records in a random access memory. Each database 112, 114, 116, 118 and 120 contains the same data. Each of the processors 102, 104, 106, 108 and 110 also communicate with each other via a high speed data interconnect 140 which might be comprised, for example, of an Ethernet network or other appropriate data link whereby data can be exchanged between each of the processors shown in FIG. 1. The distributed network of processors 100 shown in FIG. 1 might be used in a telephone switching network wherein each processor 102, 104, 106, 108 and 110 may be responsible for handling calls. Alternatively, the distributed network of processors 100 might be used in other applications such as, but not limited to, an airline reservation system or banking records.

The databases 112, 114, 116, 118 and 120 which might contain customer records, telephone numbers, airline flight reservation schedules and the like. In operation, each of the processors needs to access its associated database to process transactions and in most applications, imperative that each database 112, 114, 116, 118 and 120 be an exact copy of every other database in the distributed network of processors 100.

As transactions are processed by the database processors 102, 104, 106, 108 and 110, the database copies 112, 114, 116, 118 and 120 may need to be updated in order to assure that each copy of the database is identical to each other or every other copy.

The master database processor 102 updates database copies 114, 116, 118 and 120. A database record within one of the databases that needs to be updated in the database copies 116, 118 and 120, is updated by the master database processor by sending the record update to each copy of the database 112, 114, 116, 118 and 120. The master database processor interrogates each slave or participant processor 106, 108 and 110 to determine if each slave or participant processor is ready to accept an update. Thereafter, the master database processor copies a record to be updated to the slave or participant processors 106, 108, 110 and 114 and after the copy is delivered to these slave or participant processors, they are interrogated by the master processor 102 to see if the update was effectively completed.

Resynchronization of a Failed Slave Processor

In the event one or more of the slave or participant processors fails, the master processor 102 cannot update the associated copy of the database. For example, if slave database processor 106 fails, updates to database copy 116 cannot take place. When this failed processor eventually returns to service or recovers from the failure, its database may need to be updated to match the other copies of the database that might have been updated by the master during the time that it was failed and out of service.

The term failure as used herein, refers to a processor state when database processors 106, 108 and 110 are unable to receive database update transactions. A failure occurs when some condition forces database processors 106, 108 and 110 into a state requiring recovery before rejoining the distributed network of processors 100. By its definition, failure implies that database processors 106, 108 and 110 were previously active members of the quorum at the time of failure.

The method of updating or synchronizing a database of a failed processor after the failed processor recovers or returns to service requires that each slave or participant processor record the last database update that it was able to complete prior to failure. Each database processor 106, 108, 110 and 102 and 104 needs to record some indicia of the last database update that was effectively completed by that processor. Such an indicia of the last record completed might be a number arbitrarily assigned to identify the update that was last completed under the direction of the master processor 102 and might be stored in random access memory (RAM) of a processor, on a disk or other media in a file or portion thereof, or other appropriate device wherein data can be written to and read from. Alternatively, each processor might keep a complete record of the last update transaction.

Within the master database processor 102, and the backup processor 104 as well, there is kept a journal or log, 122 and 124 respectively, that is a record of steps of database update transactions performed and successfully completed by the master processor 102. This journal records steps of database update transactions.

In a preferred embodiment, the database update journal, 122 and 124 respectively, is a circular buffer wherein database update transactions are sequentially stored. Eventually, an older database update record is rewritten with the most recent update transaction, as those skilled in the art will recognize is a characteristic of any circular buffer.

Alternatively, the database update journal might be arranged as either a FIFO or LIFO buffer, which those skilled in the art will recognize may be other methods for recording transactions that are completed by the master processor 102.

Upon the recovery of a failed processor, update or resynchronization of its associated database copy can be accomplished by the previously failed processor signaling to the master processor 102 the identity or indicia of the last successfully completed database update. FIG. 1 also shows within each database processor 106, 108 and 110 data storage element 126, 128 and 130 for storing an appropriate indicia of the last completed database update transaction. Using this information from the previously failed processor, the master processor 102 needs only thereafter to copy from its journal, the complete record of database update transactions that took place subsequent to the last successful database update completed by the previously failed database processor.

Those skilled in the art will recognize that the journal record may be updated by the master database processor 102 as the master database processor copies to the previously failed processor, records of the database update transaction. In this fashion, the master database processor 102 can copy to a failed processor 106, 108 and 110, for example, database updates that were required in the process of bringing the previously failed processor back online.

The database record shown 112, 114, 116, 118 and 120 might be comprised of disc records that might also be stored on tape or other magnetic media and may also be records in a random access memory. Similar, the journal 122 and 124 may be kept as disc records, tape records or also stored in random access memory of the processor. Those skilled in the art will recognize that the database processors 102, 104, 106, 108 and 110 can be any suitable computer.

Failure of a Master Processor

In the event master database processor 102 fails, either during the body of a transaction or during a two-phase commit, there must be an appropriate disposition of a pending transaction or the distributed database network will enter an indeterminate state. For example, slave database processor 126 may not recognize a problem at master database processor 102 and will proceed to commit an update transaction. The data is committed to database 116. However, slave database processor 108 may recognize a problem at master database processor 102 and will proceed to abort the update transaction. The data committed to database 116 is not committed to database 118. The data contained in database 116 will therefore be different from the data contained in database 118. This is referred to as an indeterminate state because in distributed network of processors 100, databases 112, 114, 116, 118 and 120 must contain the same data for the network to operate properly.

The method of recovery from the failure of master database processor 102 requires database processors 104, 106, 108 and 110 to come to the identical disposition with respect to an update transaction, i.e. all database processors must commit the transaction or all database processors must abort the transaction. In an improvement over the prior art, transaction disposition is accomplished without the guidance of a new master and without redoing or undoing the transaction.

Figure 2:
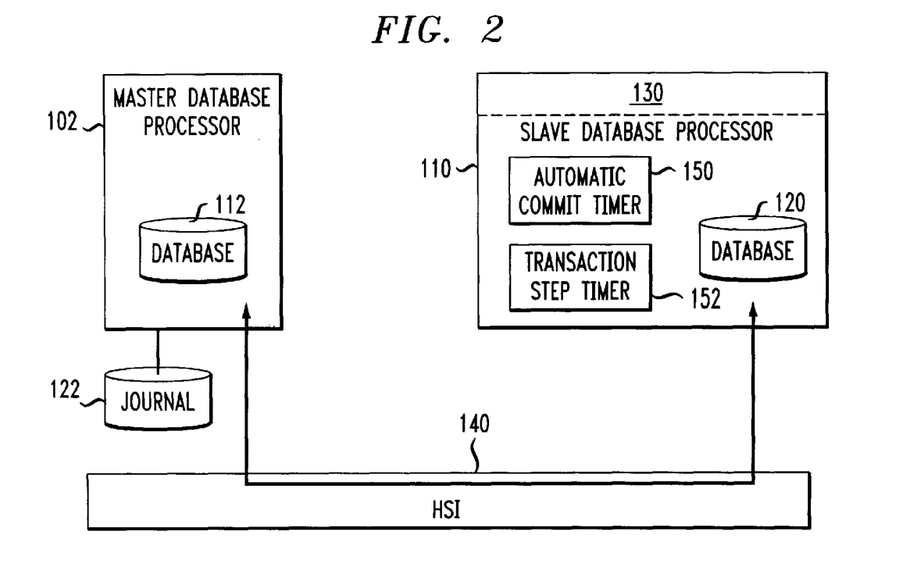
FIG. 2 is a simplified block diagram of the a master database processor and a slave database processor.

As shown in FIG. 2, there are two timers associated with a database processor 110. The first timer associated with each database processor is a transaction step timer 152. Transaction step timer 152 is set to a specific length, referred to as the timer window. Transaction step timer 152 starts when a database update transaction is received. If database processor 110 does not receive each step of the update transaction (i.e. does not receive the end step of the transaction) within the timer window, the database processor will automatically abort the transaction. Transaction step timer 152 resets each time a step of a transaction is received. Additionally, transaction step timer 152 is disabled if database processor 110 receives a request to commit message from the master database processor 102.

The second timer associated with database processor 110 is an automatic commit timer 150. When database processor 110 votes to commit a transaction, a vote to commit message is sent to master database processor 102. Automatic commit timer 150 starts when the vote to commit message is sent. Once a database processor votes to commit a transaction in a two-phase commit procedure, it will automatically commit the transaction when automatic commit timer 150 expires unless the database processor receives an abort message.

Another unique aspect of the present invention is a global abort messaging system. If any database processor 104, 106, 108, or 110 aborts a transaction, the database processor will broadcast an abort message such that all other processors will see that an abort occurred. The receipt of an abort message compels a database processor to abort the transaction. In some cases, the reception of the abort message may or may not be necessary or useful to a particular database processor, in which case the abort message is discarded.

For example, if database processor 110 aborts a transaction, a global abort message is sent by database processor 110 to database processors 102, 104, 106, and 108. Database processors 102, 104, 106, and 108 receive the global abort message and abort the transaction. Further, if database processor 106 independently decides to abort the transaction, the abort message received by database processor 106 is duplicative and discarded.

The timer window of transaction step timer 152 can be engineered to an appropriate length such that transaction step timer 152 is shorter than the automatic commit timer 150. In doing so, if some database processors vote to commit and some database processors decide to abort, transaction step timer 152 will expire and the aborting database processor will time out and send a global abort message. The database processors that have voted to commit and therefore their respective automatic commit timers are running will receive the global abort message and cancel their respective automatic commit timer. Database processors 102, 104, 106, 108, and 110 will abort and all databases will come to the identical disposition.

There are two master failure conditions that the present invention addresses. Master database processor 102 may fail during the body of a transaction or master database processor 102 may fail during the two-phase commit.

Under the first condition, master database processor 102 fails during the body of a transaction, i.e. while a step in the transaction is occurring but prior to database processors 104, 106, 108, and 110 voting to commit the transaction. If the master database processor 102 fails at this point, the transaction step timers associated with database processors 104, 106, 108 and 110 will expire or time-out. In response to a time-out of the transaction step timers, database processors 104, 106, 108, and 110 abort the transaction.

Under the second condition, master database processor 102 fails during a two-phase commit. At this point, database processors 104, 106, 108, and 110 have received the end step of an update transaction or the master has sent a request to commit message, and database processors 104, 106, 108, and 110 are in position to send a vote to commit message to master database processor 102. There are three possible scenarios after database processors 104, 106, 108, and 110 receive the end step of an update transaction.

In the first case, none of database processors 104, 106, 108, or 110 vote to commit the transaction before the master database processor 102 fails. As an example, the master database processor 102 fails after database processors 104, 106, 108 and 110 receive the last step of the update transaction but prior to the master database processor 102 sending a message asking if each processor can commit. Under this scenario, all the database processors will time-out because the transaction step timer is still active and all the database processors will abort the transaction. The transaction step timer is disabled after the associated database processor receives the message requesting a commit.

In the second case, database processors 104, 106, 108, and 110 vote to commit and then the master fails. Under this scenario, the automatic commit timers associated with all database processors will time-out and all database processors will commit the transaction.

In the third case by example, database processors 104 and 106 vote to commit the transaction and database processors 108 and 110 determine to abort. Under the global abort messaging system described previously, the aborting members will time-out quicker than the committing members such that the committing members will receive the global abort message prior to committing the transaction. Therefore, all database processors will abort the transaction and databases 112, 114, 116, 118 and 120 will remain identical.

FIGS. 3A, 3B, 4, 5, 6 and 7 show flow diagrams of various aspects of the method for allowing all non-failing participants to automatically perform any fault recovery and complete update transactions without external coordination. In order to understand the process completely, it is important to understand that master database processor 102, backup master database processor 104, and slave database processors 106, 108 and 110 are programmed such that various algorithms perform the following enumerated steps.

Figure 3A:
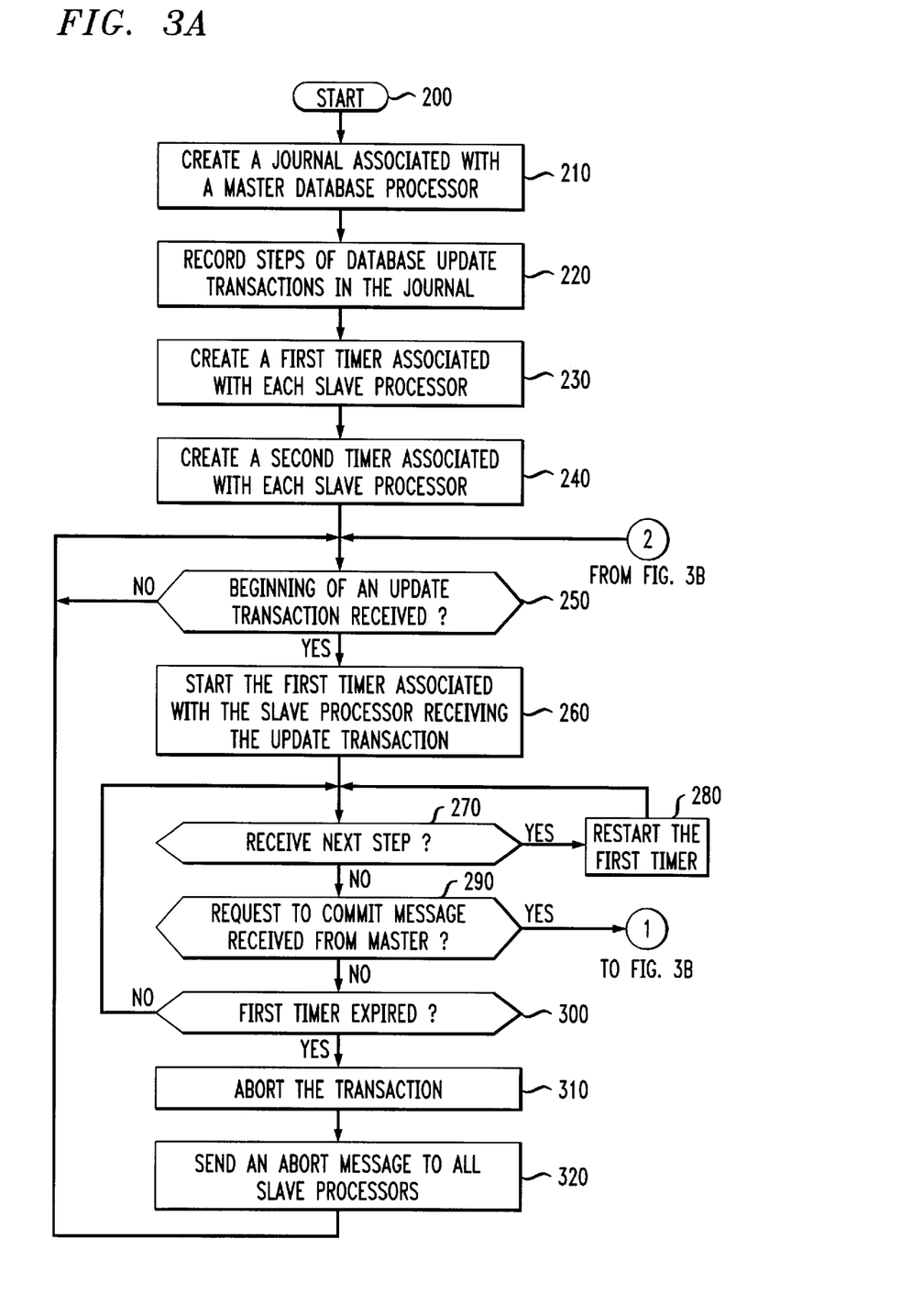
FIGS. 3A and 3B are flow diagrams of various aspects of the method for allowing all non-failing participants to automatically perform fault recovery and complete update transactions without external coordination.
Figure 3B:
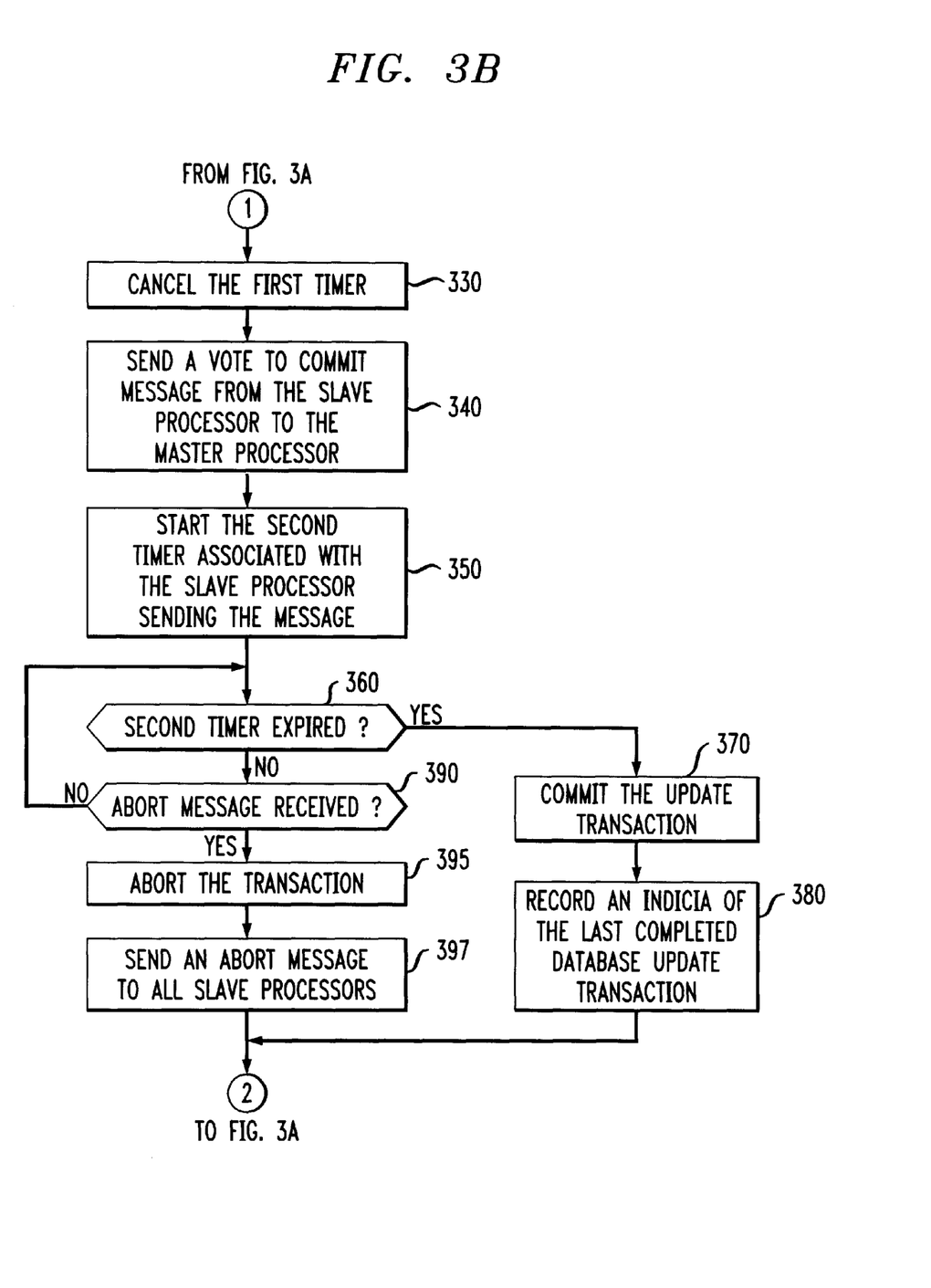

With reference to FIGS. 3A and 3B, in step 210, journal 122 (shown in FIGS. 1 and 2 and described above) associated with master database processor 102 (not shown) is created. In step 220, steps of database update transactions are recorded in journal 122. As shown in steps 230 and 240, two timers associated with each slave database processor 106, 108 and 110 are created. In step 250, slave processors 106, 108 and 110 query whether the beginning of a database update transaction has been received. This query continues in a continuous loop until the slave database processor receives a database update transaction. In step 260, the first timer associated with the slave processor receiving the database update transaction is started.

In step 270, the slave processor receiving the update database transaction queries whether the next step of the database update transaction is received. If the next step in the database update transaction is received, the first timer is reset and restarted as shown in step 280, and the slave processor receiving the database update transaction once again queries whether it has received the next step as shown in 270. If in step 270 a next portion of the database update transaction is not received, the database queries whether a request to commit message is received from master database processor 102 as shown in step 290. If the request commit message is not received, in step 300 the slave processor queries whether or not the first timer has expired. If the first timer has not expired, in step 270 the slave processor queries whether or not the next step of the database update transaction is received. If the first timer has expired, the slave processor aborts the transaction as shown in step 310 and sends a global abort message to all other slave processors, as shown in step 320. The slave processor is in position to receive new database update transactions, and therefore returns to step 250.

If in step 290 a request to commit message is received from master database processor 102, the first timer is canceled, as shown in step 330. In step 340, the slave processor sends a vote to commit message to the master database processor 102. The second timer associated with the slave processor sending the vote to commit message is started, as shown in step 330. After starting the second timer, the associated slave processor queries whether the second timer has expired, as shown in step 360. If the second timer is expired, the database update transaction is committed, as shown in step 370. In step 380, the appropriate slave database processor records an indicia of the last committed database update transaction and is ready to receive the beginning of a new database update transaction.

If the second timer is not expired, the slave database processor queries whether an abort message has been received, as shown in step 390. If an abort message has not been received, the slave database processor again queries whether or not the second timer has expired, as shown in step 360. If an abort message is received, the slave database processor aborts the database update transaction as shown in step 395 and sends a global abort message to all slave processors as shown in step 397. The slave processor aborting the database update transaction is in position to receive new database update transactions.

Figure 4:
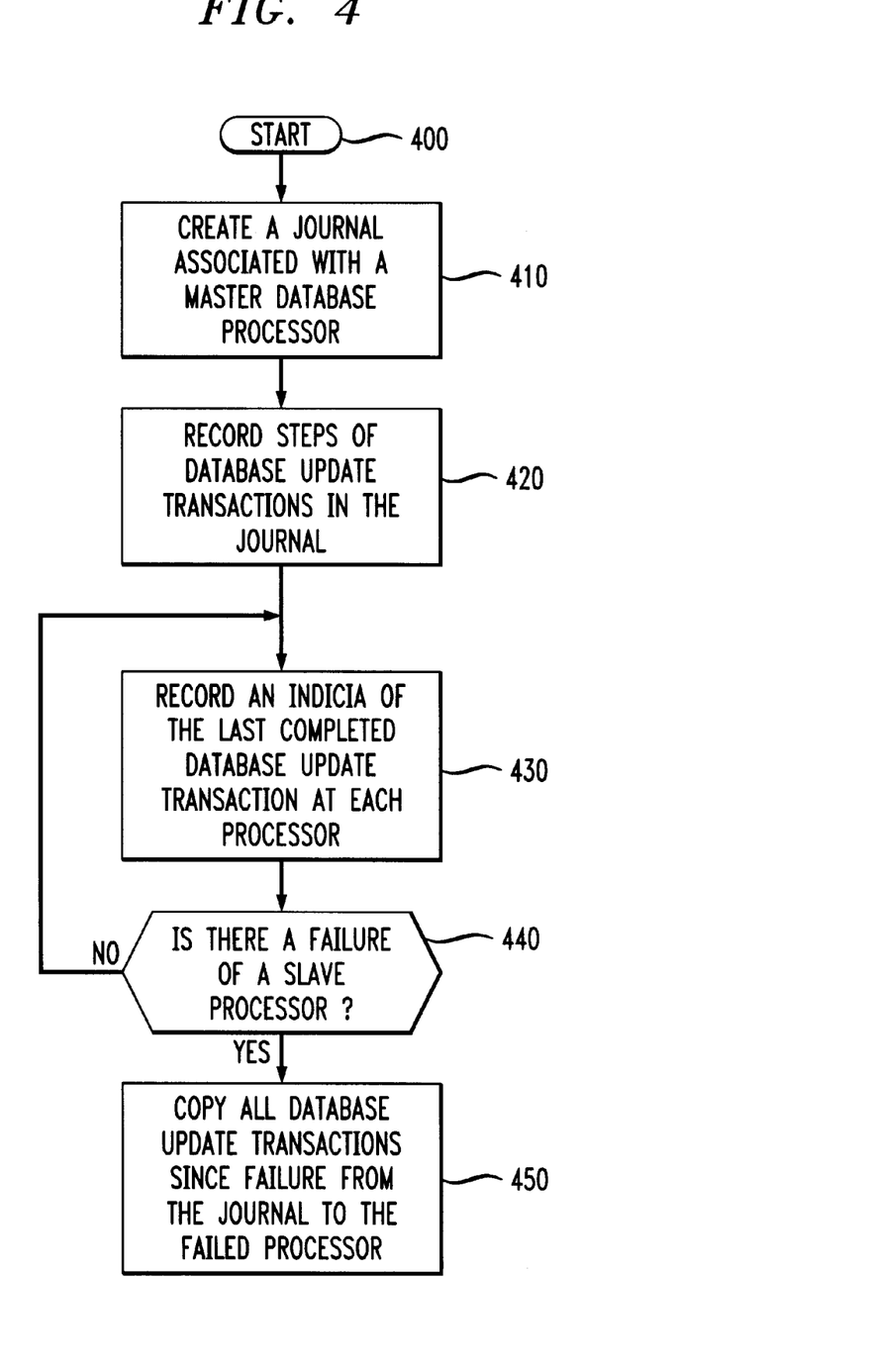
FIG. 4 is a flow diagram of failure recovery of a failed slave processor.

FIG. 4 shows a flow diagram of failure recovery of a failed slave processor. After a journal 122 (shown in FIGS. 1 and 2 and described above) associated with master database processor 102 (not shown) is created, as shown in step 410, steps of database update transactions are recorded in journal 122 as shown in step 420. Slave database processors 106, 108 and 110 record an indicia of the last complete database update transaction that was committed at each processor, as shown in step 430. In step 450, if there is a failure of slave processor 106, 108 or 110, all database update transactions since the failure will be copied from the journal to the appropriate failed processor.

Figure 5:
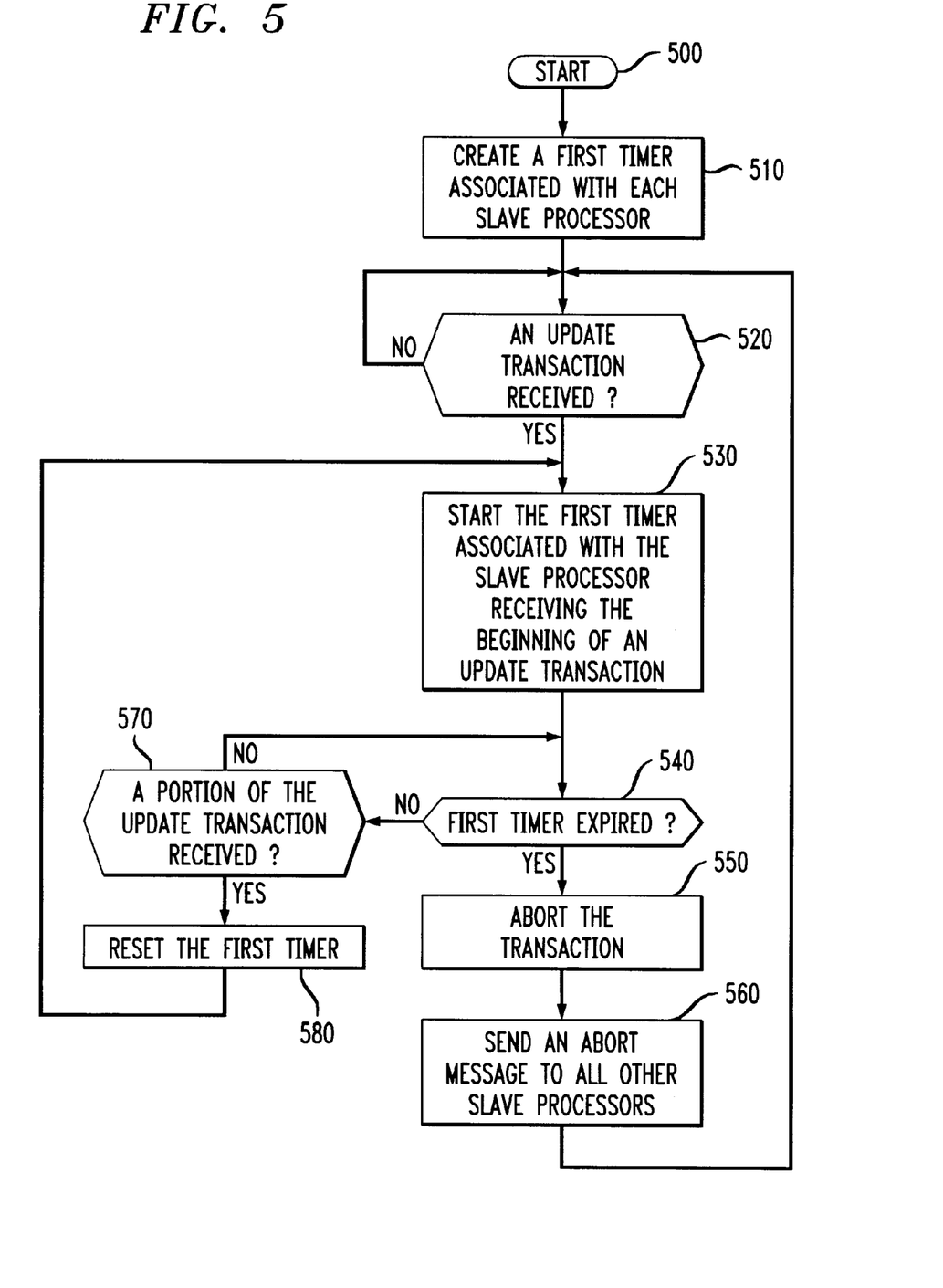
FIG. 5 is a flow diagram of the general operation of the transaction step timer.

FIG. 5 shows a flow diagram of the general operation of the transaction step timer 152 (shown in FIG. 2 and described above). Once the first timer is created and associated with a slave processor, as shown in step 510, the slave processor queries whether an update transaction is received, as shown in step 520. If a database update transaction is not received, the algorithm loops and again queries whether a database update transaction is received. If a database update transaction is received by the slave processor, the first timer associated with the slave processor receiving the database update transaction will start, as shown in step 530. In step 540, the slave database processor then queries whether the first timer is expired. If the first timer is expired, the database update transaction is aborted, as shown in step 550, and a global abort message is sent to all slave processors, as shown in step 560. If the first timer is not expired, the slave database processor queries whether a portion of the database update transaction has been received, as shown in step 570. If a portion is not received, then the slave database processor once again inquires whether the first timer has expired, as shown again in step 540. If a portion of the update transaction is received, the first timer is reset, as shown in step 580, and the first timer is restarted.

Figure 6:
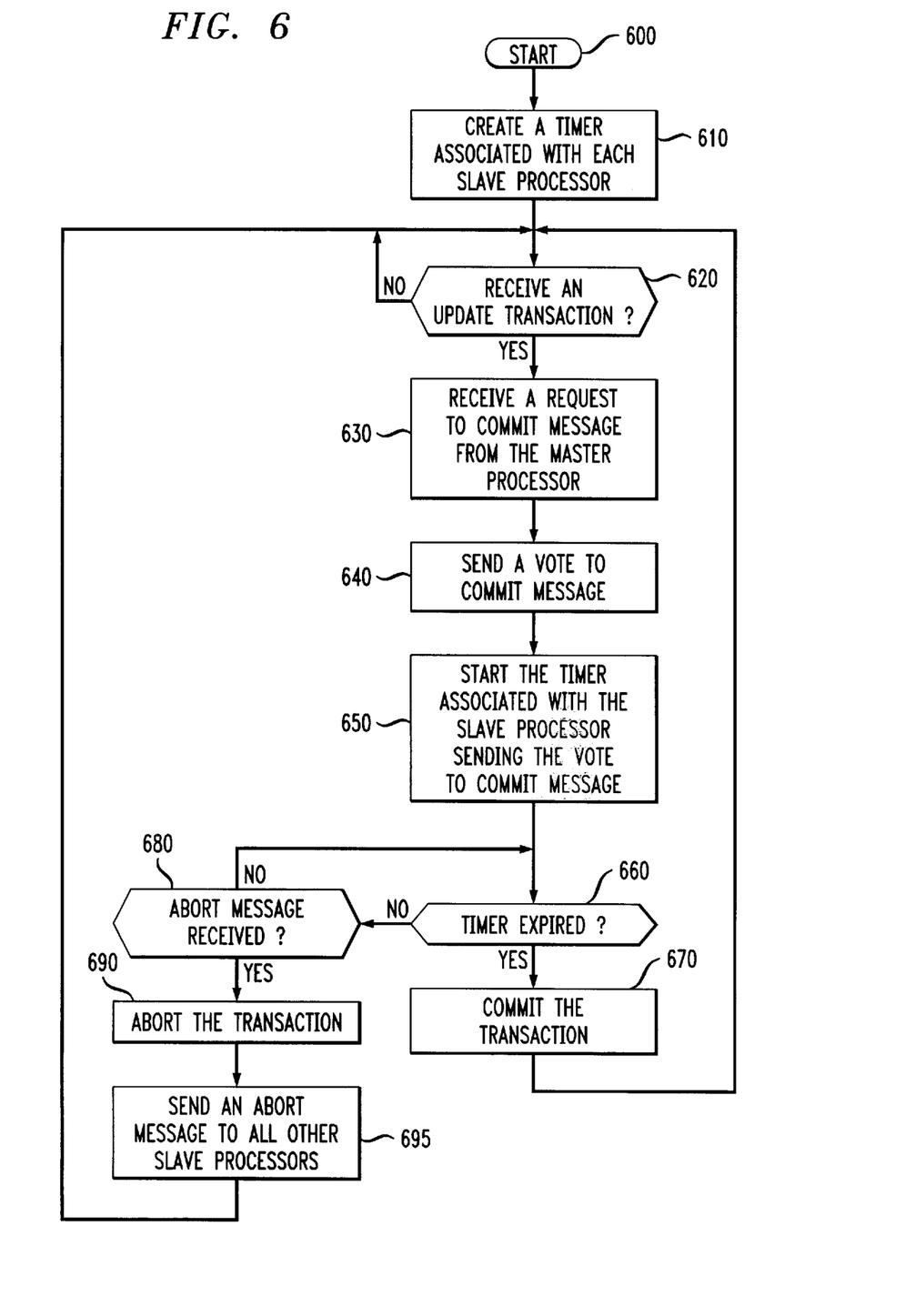
FIG. 6 is a flow diagram of the general operation of the automatic commit timer.

FIG. 6 shows a flow diagram of the general operation of the automatic commit timer 150 (shown in FIG. 2 and described above). Once the timer is created, as shown in step 610, in step 620 the slave database processor queries whether it has received a database update transaction. Each time the response is that a database update transaction is not received, the algorithm loops and continues to ask whether a database update transaction is received. If a database update transaction is received, the slave database processor will at some point receive a request to commit message from master database processor 102 (not shown). After receiving the request to commit message, the slave database processor sends a vote to commit message to master database processor 102, as shown in step 640. In step 650, the timer associated with the slave processor sending the vote to commit message is started. The slave database processor then queries whether the timer is expired, as shown in step 660. If the timer is expired, the database update transaction is committed, as shown in step 670. If the timer is not expired, the slave database processor queries whether a global abort message has been received, as shown in step 680. If the global abort message has not been received, the algorithm loops and again queries whether the timer has expired, as shown in step 650. If a global abort message is received in step 680, the slave database processor aborts the database update transaction, as shown in step 690 and sends a global abort message to all slave processors, as shown in step 695. The slave processor aborting the database update transaction is in position to receive new database update transactions.

Figure 7:
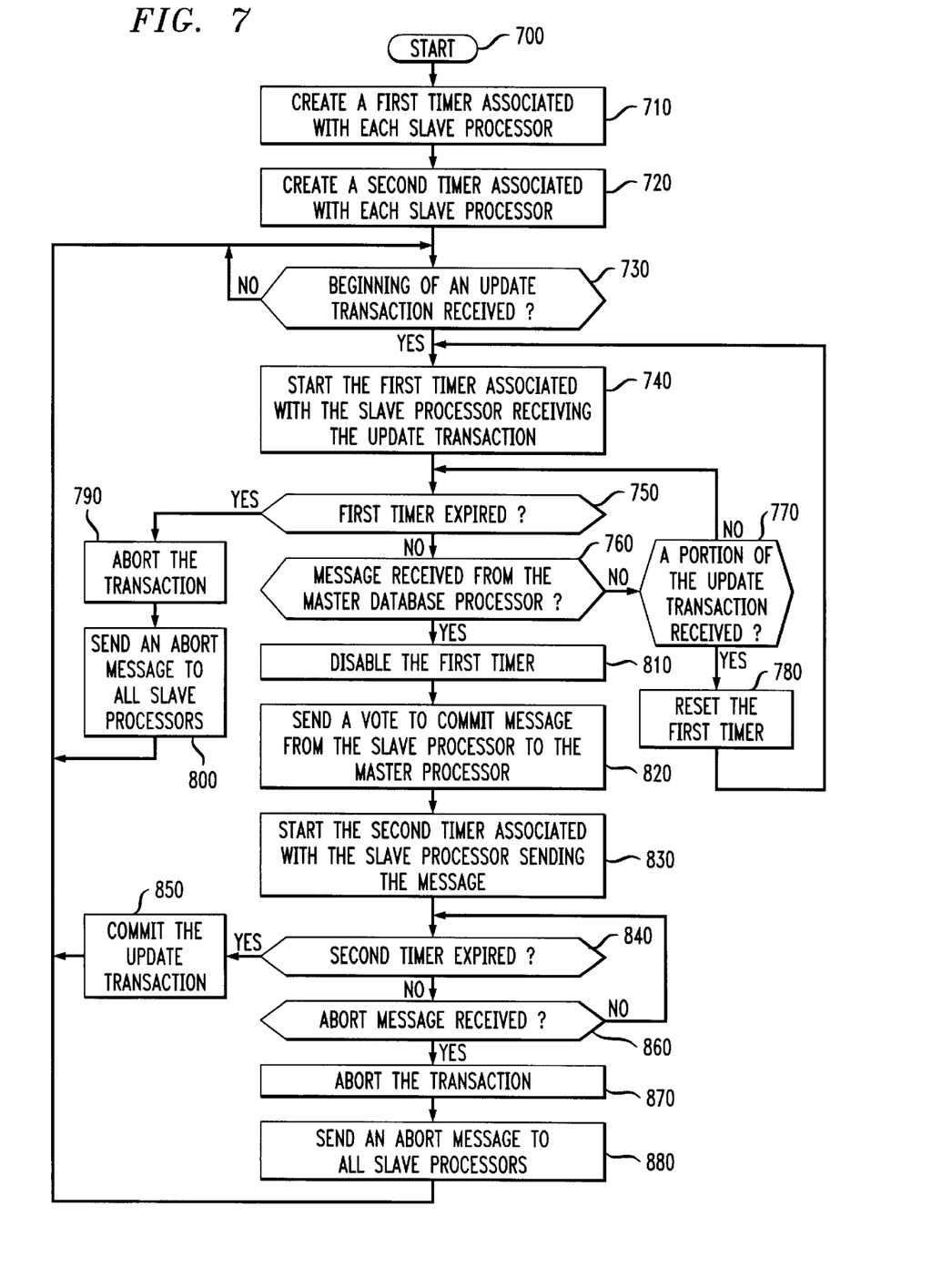
FIG. 7 is a flow diagram of a general overview of the coordination between the automatic commit timer and the transaction step timer.

FIG. 7 shows a flow diagram of a general overview of the coordination between the automatic commit timer 150 and the transaction step timer 152 (both shown in FIG. 2 and described above). Once each of the timers are created and associated with each of the slave processors, as shown in step 710 and step 720, each slave database processor queries whether the beginning of an update database transaction is received, as shown in step 730. If the beginning of an update transaction is not received, the algorithm loops and again queries whether the beginning of a database update transaction is received. If the beginning of a database update transaction is received, the transaction step timer associated with the slave processor receiving the database update transaction is started, as shown in step 740. In step 750, the slave database processor queries whether the first timer is expired. In step 760 if the first timer is not expired, the slave database processor queries whether a request to commit message is received from master database processor 102 (not shown). If the request to commit message is not received, the slave database processor queries whether a portion of the database update transaction is received, as shown in step 770. If a portion is not received, the slave database processor queries whether the first timer is expired, as shown in step 750. If a portion of the update transaction is received, the transaction step timer is reset and restarted.

If a request to commit message is received from the master database processor 102, the transaction step timer is disabled, as shown in step 810. In step 820, the slave database processor sends a vote to commit message to the master database processor 102. The second timer associated with the slave processor sending the vote to commit message is started, as shown in step 830. In step 840, the slave database processor queries whether the second timer is expired. If the second timer is expired, the slave database processor commits the database update transaction, as shown in step 850. The slave processor is ready to receive new database update transactions. If the second timer is not expired, the slave database processor queries whether an abort message is received, as shown in step 860. If an abort message is received, then the slave database processor aborts the database update transaction as shown in step 870 and sends a global abort message to all the other slave processors as shown in step 880. The slave database processor is ready to receive a new database update transaction.

Using the invention described herein, a network of connected database processors can account for the failure of either the master database processor or any one of the slave processors thereby eliminating the need to interrupt the processing capability to repair the failure condition. The recovery or resynchronization process takes place independent of ongoing processing in the networking environment, thereby increasing the reliability of the network and decreasing the downtime of the system to recover from failure.

The invention has been described with reference to the preferred embodiment. Obviously, modifications and alterations will occur to others upon reading and understanding of this specification. It is intended to include all such modifications and alterations insofar as they come within the scope of the appended claims or the equivalents thereof.

Using the invention described herein, a network of connected database processors can account for the failure of either the master database processor or any one of the slave processors thereby eliminating the need to interrupt the processing capability to repair the failure condition. The recovery or resynchronization process takes place independent of ongoing processing in the networking environment, thereby increasing the reliability of the network and decreasing the downtime of the system to recover from failure.

The invention has been described with reference to the preferred embodiment. Obviously, modifications and alterations will occur to others upon reading and understanding of this specification. It is intended to include all such modifications and alterations insofar as they come within the scope of the appended claims or the equivalents thereof.

What is claimed is:

1. In a system comprised of at least one master processor and a plurality of slave processors wherein each processor accesses and controls a database associated with each processor, a method for compensating for a failure condition involving either said at least one master processor or any one of said plurality of slave processors, said method comprising the steps of:
   a) recording the last completed database update transaction at said each processor;
   b) creating a journal operatively associated with said at least one master database processor for recording steps of a predetermined number of database update transactions generated by said at least one master database processor;
   c) recording said steps of database update transactions in said journal;
   d) creating a plurality of first timers, each of said plurality of slave processors having associated with it, at least one of said plurality of first timers;
   e) creating a plurality of second timers, each of said plurality of slave processors having associated with it, at least one of said plurality of second timers;
   f) starting said at least one of said plurality of first timers at the beginning of an update transaction;
   g) sending a predetermined message from a first one of said plurality of slave processors to said at least one master processor at the end of an update transaction;
   h) starting said second timer associated with said first one of said plurality of slave processors when said predetermined message is sent to said at least one master processor;
   i) in the event of failure of any one of said plurality of slave processors:
      A) copying to said failed processor from said journal all database update transactions subsequent to the last database update of the previously failed processor;
   j) in the event of failure to said at least one master processor:
      A) detecting the expiration of said at least one of said plurality of first timers prior to the expiration of said at least one of a plurality of second timers and thereafter:
         1) aborting said current update transaction;
         2) sending an abort message to said plurality of slave database processors by said slave processor associated with the expired at least one of said plurality of first timers;
      B) detecting the expiration of said at least one of said plurality of second timers and thereafter committing said current update transaction.

2. The method of claim 1, further comprising the step of resetting said at least one of said plurality of first timers after the associated slave processor receives each step of an update transaction, said step being performed after step f) but before step g).

3. The method of claim 1, wherein said step h) further comprises the step of disabling said at least one of said plurality of first timers associated with said first one of said plurality of slave processors.

4. The method of claim 1, wherein said step b) is comprised of creating a circular buffer for recording steps of database update transactions generated by the master database.

5. The method of claim 1, wherein said journal is updated during steps a) through j).

6. In a distributed network of processors, comprised of at least one master processor and a plurality of slave processors wherein each processor accesses and controls a database associated with each processor, a method for updating a database of a failed slave processor to match other databases after said failed slave processor recovers comprising the steps of:
   a) recording a record of the last completed database update transaction at each processor located in the distributed network during a first timer window established by a first timer from a plurality of first timers, wherein each first timer from the plurality of first timers is associated with each processor;
   b) creating a journal operatively associated with said master database processor located in the distributed network that records the steps of database update transactions generated by the master database processor during a second timer window established by a second timer associated with each processor, wherein the second timer is from a plurality of second timers;
   c) recording said steps of database update transactions in said journal;
   d) upon the recovery of the failed processor located in the distributed network, copying to said failed processor from said journal all database update transactions subsequent to the last database update of the previously failed processor; and
   e) updating the database associated with said failed processor with all database update transactions subsequent to the last database update.

7. The method according to claim 6, wherein said step b) is comprised of creating a circular buffer for recording steps of database update transactions generated by the master database.

8. The method according to claim 7, wherein said circular buffer is updated during steps a) through d).

9. The method according to claim 6, where said step a) is further comprised of the step of recording the number of the last database update transaction.

10. The method according to claim 6, where said step a) is further comprised of the step of recording a complete copy of the last database update transaction.

11. The method according to claim 6, where said step a) is further comprised of the step of recording the date of the last database update transaction.

12. The method according to claim 6, wherein said step a) is further comprised of the step of recording the time of the last database update transaction.

13. The method according to claim 6, further including the step of copying to the failed slave processor, database update transactions that occurred during steps a) through d).

14. The method according to claim 6, further comprising the steps of:

e) designating a processor as a back-up master processor;
f) creating a journal operatively associated with said back-up master processor;
g) recording into the journal operatively associated with said back-up master processor, the information recorded into the journal operatively associated with said master database processor.

15. In a distributed network of processors, comprised of at least one master processor and a plurality of slave processors wherein each processor accesses and controls a database associated with each processor, a method for completing update transactions after failure of said at least one master processor comprising the steps of:

creating a plurality of timers, operatively associated with said plurality of slave processors such that each of said plurality of slave processors is associated with at least one of said plurality of timers;
receiving a current update transaction at a first one of said plurality of slave processors;
sending a vote to commit message from said first one of said plurality of slave processors to said at least one master processor upon receiving said current update transaction;
starting said at least one of a plurality of timers associated with said any one of said plurality of slave processors sending said message; and
responding to the expiration of said at least one of a plurality of timers.

16. The method of claim 15, wherein said step of responding to the expiration of said at least one of a plurality of timers further comprises the step of committing said current update transaction.

17. The method of claim 15, further comprising the steps of:

receiving an abort message from said any one of said plurality of slave processors before the expiration of said at least one of a plurality of timers; and
aborting said current update transaction by said any one of said plurality of slave processors receiving said abort message.

18. The method of claim 15, further comprising the step of sending an abort message to said plurality of slave database processors by said any one of said plurality of slave processors receiving said abort message.

19. In a distributed network of processors, comprised of at least one master processor and a plurality of slave processors wherein each processor accesses and controls a database associated with each processor, a method for completing update transactions after failure of said at least one master processor comprising the steps of:

a) creating a plurality of first timers operatively associated with said plurality of slave processors such that each of said plurality of slave processors is associated with at least one of said plurality of first timers;
b) creating a plurality of second timers operatively associated with said plurality of slave processors such that each of said plurality of slave processors is associated with at least one of said plurality of second timers;
c) starting said at least one of said plurality of first timers in response to the associated slave processor receiving a begin step of a current update transaction;
d) sending a message from any one of said plurality of slave processors to said at least one master processor in response to the associated slave processor receiving the end step of a current update transaction;
e) starting said at least one of a plurality of second timers associated with said any one of said plurality of slave processors sending said message in response to sending said message; and
f) detecting the expiration of said at least one of said plurality of first timers or said at least one of a plurality of second timers.

20. The method of claim 19, further comprising the steps of:

g) detecting the expiration of said at least one of said plurality of first timers prior to the expiration of said at least one of a plurality of second timers; and
h) aborting said current update transaction.

21. The method of claim 20, further comprising the step of:

i) sending an abort message to said plurality of slave database processors by said slave processor associated with the expired at least one of said plurality of first timers.

22. The method of claim 21, further comprising the steps of:

j) receiving the abort message by one of said plurality of slave processors;
k) aborting the current update transaction by said one of said plurality of slave processors; and
l) sending an abort message to said plurality of slave processors by said one of a plurality of slave processors.

23. The method of claim 22, further comprising the steps of:

f) detecting the expiration of said at least one of said plurality of second timers;
g) committing said current update transaction.

24. In a distributed network of processors, comprised of at least one master processor and a plurality of slave processors wherein each processor accesses and controls a database associated with each processor, a method for completing update transactions after failure of said at least one master processor comprising the steps of:

a) creating a plurality of first timers operatively associated with said plurality of slave processors such that each of said plurality of slave processors is associated with at least one of said plurality of first timers;
b) creating a plurality of second timers operatively associated with said plurality of slave processors such that each of said plurality of slave processors is associated with at least one of said plurality of second timers;
c) starting said at least one of said plurality of first timers in response to the associated slave processor receiving a begin step of a current update transaction;
d) resetting said at least one of said plurality of timers in response to receiving a portion of said update transaction by said associated slave processor;
e) disabling said at least one of said plurality of timers in response to receiving a message from said at least one master processor;
f) sending a message from any one of said plurality of slave processors to said at least one master processor in response to the associated slave processor receiving the end step of a current update transaction;
g) starting said at least one of a plurality of second timers associated with said any one of said plurality of slave processors sending said message in response to sending said message;

h) detecting the expiration of said at least one of said plurality of first timers prior to the expiration of said at least one of a plurality of second timers and thereafter:
 i) aborting said current update transaction;
 ii) sending an abort message to said plurality of slave database processors by said slave processor associated with the expired at least one of said plurality of first timers;

i) detecting the expiration of said at least one of said plurality of second timers and thereafter committing said current update transaction.

25. A distributed network of processors each processor having associated therewith a database comprising:
 a master processor for updating databases associated with said each processor;
 a plurality of slave processors recording database updates sent by said master processor;
 a plurality of first timers, each of said plurality of slave processors having associated with it, at least one said plurality of first timers, each first timer having associated therewith a first timer window;
 a plurality of second timers, each of said plurality of slave processors having associated with it, at least one of said plurality of second timers, each second timer having associated therewith a second timer window;
 a journal, associated with said master processor, for recording steps of database update transactions successfully completed by the master database processor wherein said journal is used for updating or re-synchronizing a database of said failed slave processor after the failed processor recovers or returns to service; and
 a high speed data interconnect for interconnecting said master processor and said plurality of slave processors.

26. The apparatus of claim 25, wherein at least one of said journal further comprises a circular buffer for storing database update transactions.

27. The apparatus of claim 25, wherein at least one of said plurality of slave processors further comprise at least one database record for storing the last completed update transaction.

28. The apparatus of claim 27, wherein at least one of said database record further comprises
 random access memory.

29. The apparatus of claim 25, wherein at least one of said plurality of slave processors further comprise at least one electronic storage media device storing an indicator of the last completed update transaction.

30. The apparatus of claim 25, wherein said high speed data interconnect further comprises Ethernet.

31. A distributed network of processors each processor having associated therewith a database comprising:
 a master processor for updating databases associated with said each processor via a two-phase commit;
 a plurality of slave processors recording database updates sent by said master processor;
 a plurality of first timers, each of said plurality of slave processors having associated with it, at least one said plurality of first timers, each first timer having associated therewith a first timer window;
 a plurality of second timers, each of said plurality of slave processors having associated with it, at least one of said plurality of second timers, each second timer having associated therewith a second timer window;
 a journal operatively associated with said at least one master database processor for recording steps of database update transactions generated by said at least one master database processor; and
 a memory means for storing an indicia of the last completed database update transaction performed by said slave processor.

32. The apparatus of claim 31, wherein said plurality of first timers are of a longer duration than said plurality of second timers.

* * * * *